US012491837B2

(12) United States Patent
Subramanian et al.

(10) Patent No.: US 12,491,837 B2
(45) Date of Patent: Dec. 9, 2025

(54) ELECTRONIC SIGNAL BASED AUTHENTICATION SYSTEM AND METHOD THEREOF

(71) Applicant: Rajarajeswari Sundaram, Chennai (IN)

(72) Inventors: Sundaram Subramanian, Chennai (IN); Srikanth Krishnaswamy, Chennai (IN)

(73) Assignee: RAJARAJESWARI SUNDARAM, Chennai (IN)

( * ) Notice: Subject to any disclaimer, the term of this patent is extended or adjusted under 35 U.S.C. 154(b) by 270 days.

(21) Appl. No.: 17/759,588

(22) PCT Filed: Feb. 4, 2021

(86) PCT No.: PCT/IN2021/050112
§ 371 (c)(1),
(2) Date: Jul. 27, 2022

(87) PCT Pub. No.: WO2021/156891
PCT Pub. Date: Aug. 12, 2021

(65) Prior Publication Data
US 2023/0089891 A1 Mar. 23, 2023

(30) Foreign Application Priority Data
Feb. 5, 2020 (IN) .............................. 202041005015

(51) Int. Cl.
*B60R 25/02* (2013.01)
*B60R 25/24* (2013.01)
(Continued)

(52) U.S. Cl.
CPC .............. *B60R 25/02* (2013.01); *B60R 25/24* (2013.01); *B62D 5/046* (2013.01); *G06F 21/31* (2013.01)

(58) Field of Classification Search
CPC .......... G06F 21/32; G06F 21/30; G06F 21/31; B60R 25/02; B60R 25/24;
(Continued)

(56) References Cited

U.S. PATENT DOCUMENTS 6,268,790 B1 * 7/2001 Cregeur ................. B60R 25/02
340/425.5
6,889,792 B1 5/2005 Fardoun et al.
(Continued)

FOREIGN PATENT DOCUMENTS

CN 104590209 A 5/2015
JP 2008080968 A 4/2008
(Continued)

OTHER PUBLICATIONS

International Search Report & Written Opinion dated Apr. 1, 2021 from PCT Application No. PCT/IN2021/050112, 9 pages.

*Primary Examiner* — Alexander Lagor
*Assistant Examiner* — Taylor P Vu
(74) *Attorney, Agent, or Firm* — INNOVATION CAPITAL LAW GROUP, LLP; Vic Lin

(57) ABSTRACT

The present invention relates to the field of authentication systems. More particularly, it relates to electronic signal-based authentication system. It relates to authentication system which integrates into devices in electro-mechanical systems without interfering with any of its internal functions and hence provides ease of maintenance and upgradability. The present invention relates to prevention of un-authorized usage of electro-mechanical systems. To demonstrate the signal-based authentication, the vehicle is chosen as a candidate system, since vehicles are part of daily life and has widespread usage all over the world. As an embodiment of electro-mechanical device, the present invention covering vehicle anti-theft authentication system, suggests electronic signal intervention/modification unit [5] comprising of one
(Continued)

or more microprocessors with embedded computer instructions, input-output ports, networking units, communication units, display units resulting in a highly secure authentication mechanism to prevent vehicle from being burgled and driven away.

5 Claims, 4 Drawing Sheets

(51) Int. Cl.
*B62D 5/04* (2006.01)
*G06F 21/31* (2013.01)

(58) Field of Classification Search
CPC . B60R 25/02105; B60R 25/00; B60R 25/021; B60R 25/25; B60R 25/257; B60R 25/30; B60R 25/31; B62D 5/046
See application file for complete search history.

(56) References Cited

U.S. PATENT DOCUMENTS

| | | | |
|---|---|---|---|
| 7,233,227 B2 | 6/2007 | Lemoult | |
| 9,278,669 B2* | 3/2016 | Yoshida | B60R 25/02 |
| 9,376,090 B2* | 6/2016 | Gennermann | B60R 25/04 |
| 2006/0152348 A1* | 7/2006 | Ohtaki | B60R 25/24 |
| | | | 340/426.1 |
| 2015/0025746 A1* | 1/2015 | Yoshizawa | F02N 11/0822 |
| | | | 701/41 |
| 2017/0039788 A1* | 2/2017 | Ligeski | H04W 12/06 |
| 2017/0106904 A1 | 4/2017 | Hanson et al. | |
| 2017/0223030 A1* | 8/2017 | Merza | H04L 63/1416 |
| 2019/0166134 A1* | 5/2019 | Tzeng | H04L 49/9057 |
| 2020/0218249 A1* | 7/2020 | Sannodo | B60W 30/06 |
| 2021/0039590 A1* | 2/2021 | Moeller | B60R 25/1009 |
| 2022/0084331 A1* | 3/2022 | Matsunaga | B60W 40/09 |

FOREIGN PATENT DOCUMENTS

| | | |
|---|---|---|
| JP | 2010208554 A | 9/2010 |
| WO | 2019165489 A1 | 9/2019 |

* cited by examiner

ELECTRONIC SIGNAL BASED AUTHENTICATION SYSTEM AND METHOD THEREOF

FIELD OF THE INVENTION

The present invention relates to the field of authentication systems. More particularly, it relates to the electronic signal-based authentication system. It relates to an authentication system which integrates into devices in electro-mechanical systems without interfering with any of its internal functions and hence provides an ease of maintenance and upgradability. More particularly, the present invention relates to prevention of un-authorized usage of electro-mechanical systems.

BACKGROUND OF THE INVENTION

There are a large number of costly equipments whose functionality is critical in nature. The entry into the places where these equipments are located is controlled by a variety of access control mechanisms. However, not all these access control mechanisms prevent abuse/misuse of these systems, since someone can bypass these access control systems. There is a need to incorporate an authentication system which is built into the natural functioning of the system and is fool proof. This way, even if a person gains access to operating the system and is knowledgeable about the operation of system, cannot operate the system, if he is not authorized. By providing such an authentication, we can, not only prevent unauthorized usage, but also collect vital information regarding the usage of the equipment viz., who has used for how long, what problems has occurred during the usage by a person, attempts at unauthorized access with time stamp, system shutdown event with time stamp etc. and such data collection is authentic as these are collected at source and does not involve any manual operation and can be used for variety of purposes such as controlling the usage, costing, preventive maintenance etc.

An anti-theft system is any device and/or or method used to prevent or detect the unauthorized access and/or appropriation of items considered valuable. One such system is vehicle anti-theft authentication system. Nowadays, quick and easy transport has been an essential part of our daily life. As the dark side of this phenomenon, vehicle theft has become one of the costliest property crimes of modern society. From the invention of the first lock and key to the introduction of RFID tags and biometric identification, anti-theft systems have evolved to match the introduction of new inventions to society and the resulting theft of such assets by others. Despite the various technologies that have been introduced in recent years to detect car thefts and tracking of vehicles, it is being continuously reported that many cars were stolen yearly in the world. There are still security breaches where these technologies don't prevent a vehicle from theft, don't assist to recover it and don't allow the users to know the status of their vehicles.

JP2008080968A relates to an electric power steering device and vehicle antitheft system. An electric power steering apparatus and a vehicle theft prevention system are provided that can reliably prevent theft of a vehicle without requiring a special device for theft prevention. When an IG switch for turning on/off the supply of power to a steering assist motor is off, a motor lock short circuit using a relay contact supplies power to the motor. The motor is locked by short-circuiting the power supply lines. Even when the IG switch is bypassed, the communication control unit monitors the on/off state of the IG switch, and when the IG switch is off, the short circuit is set in the motor lock state via the relay drive circuit. Further, the EPS ECU including the short circuit and the motor are integrally accommodated in the housing so that illegal work such as cutting of power supply lines, communication lines, etc., bypassing and the like is impossible. However, this patent covers a disruptive method of functional intervention by short circuiting power supply to motor forcefully stopping the motor.

JP2010208554A relates to a vehicle antitheft device, vehicle antitheft method, and program. A security level is improved without impairing convenience. An ID authentication unit authenticates an electronic key in which a vehicle-specific ID code is stored. The biometric authentication unit authenticates whether or not the boarded driver is a registered driver registered in advance based on the driver's biometric information. The mode change input unit receives an input by a registered driver when the mode is set to the password authentication mode or the provisional permission mode, and receives the mode change information indicating either the password authentication mode or the provisional permission mode as the authentication control unit. In the biometric authentication mode, the authentication control unit controls the departure of the vehicle based on the authentication results of ID authentication and biometric authentication. In the password authentication mode, the authentication control unit controls the departure of the vehicle based on the authentication results of ID authentication and password authentication. The present invention can be applied to, for example, a vehicle antitheft device that prevents the vehicle from being stolen. However, the vehicle door only will be authorized and the way of immobilizing the vehicle is different, and no functional flow intervention is achieved.

US20170106904A1 relates to a control method for vehicle with electronic steering column lock. Side loads on an Electronic Steering Column Lock (ESCL) can prevent the ESCL from releasing upon command. An Electric Power-Assisted Steering (EPAS) system is used to reduce or eliminate any side load on the ESCL to mitigate this problem. The EPAS system is activated in response to driver authentication before the driver requests a transition to a ready-to-drive state. The ready-to-drive state is entered only if the ESCL is unlocked. If a predetermined time elapses between driver authentication and the request to enter ready-to-drive state, the EPAS is deactivated and the ESCL is commanded to re-lock. However, this invention only controls the ESCL component.

U.S. Pat. No. 6,889,792B1 relates to an electrically assisted power steering system with anti-theft capability. An electrically assisted power steering system includes an anti-theft feature. Upon detection of an event that is indicative of a vehicle theft situation, the drive circuit for the electric assist motor is selectively actuated to excite the motor windings to either prevent or oppose movement of the steering system. However, electronic drive circuit uses its switches to operate the drive assist motor by energizing its windings and rotor operation. When a vehicle theft situation is detected, power supply to drive assist motor is stopped/disrupted and this amounts to interfering with the internal functions of motor operation.

CN104590209A relates to a car anti-theft alarming device. The invention discloses a car anti-theft alarming device. The car anti-theft alarming device comprises a microprocessor, a car door lock feedback module, a car side feedback module, a car wheel rotating speed feedback module, a car door lock control module, a radio frequency reader, a radio frequency identification, a direct current stabilized power source and an alarming module; the microprocessor is connected with the car door lock feedback module, the car side feedback module, the car wheel rotating speed feedback module, the car door lock control module, the radio frequency reader and the alarming module; the radio frequency reader is used for being in communication with the radio frequency identification. The car anti-theft alarming device has the advantages that the radio frequency reader and the radio frequency identification serve as identity verification modes of car door opening; when a car door is opened and the radio frequency reader does not detect identity identification information of the radio frequency identification, it is considered that the car door is abnormally opened, the microprocessor will drive the alarming module to give out acousto-optic alarms, and therefore lawbreakers can be prevented from illegally opening the car door to steal properties in a car with the method of using a car remote signal interception device and the like. However, the radio frequency reader and the electronic tag are used as the identify verification method for opening the car door and covers the electronics behind authentication and car door lock security (Access control only). This patent invention focuses on the electronics behind mechanisms such as door lock and not on functional flow intervention.

There exists a need for a method of working of the vehicle anti-theft authentication system, which does not depend on any existing solution including, steering lock, electric starter mechanism, fuel supply system etc. To demonstrate the signal-based authentication, the vehicle is chosen as a candidate system (vehicle antitheft authentication system), since vehicles are part of daily life and has widespread usage all over the world.

OBJECTS OF INVENTION

It is primary object of the present invention to provide an electronic signal-based authentication system and method thereof for protecting an electromechanical device.

It is another object of the present invention to provide a vehicle anti-theft authentication system to completely prevent an automobile from being stolen and driven away.

It is another object of the present invention to enable a complete lockdown of a vehicle with secure authentication which can be unlocked and only driven by persons duly authenticated.

It is another object of the present invention to provide a secure authentication mechanism that is future proof which can be configured by Original equipment manufacturer/dealer at point of sale.

It is another object of the present invention to provide flexibility to Original Equipment Manufacturer to seamlessly add additional security features, devices and solutions to enhance vehicle/device security either through secure cloud-based interface or in-vehicle interface or leverage the existing authentication mechanism to provide full vehicle security.

It is another object of the present invention to provide a vehicle anti-theft system that can be integrated by the Original equipment manufacturers into a new generation vehicle and retrofitted in older vehicles with ease.

It is another object of the present invention to implement a system to integrate in to a vehicle's electro-mechanical systems without disrupting any of its internal functions and hence provides ease of maintenance and upgradability.

SUMMARY OF THE INVENTION

One or more of the problems of the conventional prior art may be overcome by various embodiments of the present invention.

It is the primary aspect of the present invention to provide a signal-based authentication system for electromechanical devices, comprising of:
one or more power on/starter units;
an integrated circuit controller;
one or more signal converters;
one or more user devices;
one or more authentication input and alert signal receiver units
one or more workflow sensors/functional components;
a server;
a memory;
a power supply unit;
characterized in that, a signal intervention/modification box/unit comprising one or more microprocessors with embedded computer instructions, input-output ports, one or more networking units, one or more communication units, one or more display units;
one or more authentication modules;
one or more actuators; and
one or more alert signal units,
wherein the converters comprise of analog to digital converter, digital to analog converter and the like,
wherein the signal intervention/modification box/unit is installed between the workflow sensor/functional component and the integrated circuit controller of the device, the microprocessor in the signal intervention/modification box/unit is configured to load the security program instructions into the memory and to receive user authentication data from the user device and is programmed to fetch and compare the user authentication data against authentication data/code/image from the server/from the internal memory of microprocessor, the programmed microprocessor enables a cloud based/in-device authentication from the server and is configured to detect events indicating an unauthorized entry into/operation of the device and notifying a control function to the alert signal unit,
wherein the signal intervention unit is configured to execute instructions at the microprocessor, to provide the response to the event, based on authentication status by the authentication module, and
wherein the response comprises of allowing/altering the signal from the workflow sensor/functional component to the integrated circuit controller of the device.

It is another aspect of the present invention to provide a signal-based authentication system for electromechanical devices, wherein the analog to digital converter (ADC) is configured to read the analog signals from the sensor/component and to convert the analog signal values into digital values to the microprocessor.

It is another aspect of the present invention to provide a signal-based authentication system for electromechanical devices, wherein the microprocessor is configured to send the converted digital signal received from the sensor/component to the integrated circuit controller and allows normal function of the device, if the authentication status is valid/authentic.

It is another aspect of the present invention to provide a signal-based authentication system for electromechanical devices, wherein the alteration of signal comprises of sending of digitally altered pre-configured signal to the integrated circuit controller for functioning the device in an abnormal manner that is pre-defined, if the authentication status is invalid/failed.

It is another aspect of the present invention to provide a signal-based authentication system for electromechanical devices, wherein the signal from the workflow sensor/component comprises of voltage signal, current signal, sensor signal, optical signal, wireless signal, magnetic signal and the like.

It is another aspect of the present invention to provide a signal-based authentication system for electromechanical devices, wherein the events comprise of successful authentication, failed authentication, hacking of programs, locking of programs, recording the credentials of user, timestamp, location of equipment, system shutdown forcing only authorized user to unlock/restart the system and the like.

It is another aspect of the present invention to provide a signal-based authentication system for electromechanical devices, wherein the events are stored in the memory real-time and offline/asynchronous.

It is another aspect of the present invention to provide a signal-based authentication system for electromechanical devices, wherein the electromechanical devices comprise of steering lock device, electric starter mechanism, fuel supply system, automatic teller machine, secret locker device, authenticated medical devices for measuring/recording critical illness, vehicle anti-theft authentication system and the like.

It is another aspect of the present invention to provide a signal-based vehicle anti-theft authentication system, comprising of:
  one or more ignition switches;
  one or more converters;
  one or more user devices;
  one or more torque sensors;
  a server;
  a memory;
  a power supply unit;
  an electronic control unit;
  a steering wheel;
  a gear box;
  a rack;
  a steering column shaft;
  a steering motor;
  a global positioning system (GPS);
  characterized in that, a signal intervention/modification box/unit comprising one or more microprocessors with embedded computer instructions, input-output ports, one or more networking units, one or more communication units, one or more display units;
  one or more authentication modules; and
  one or more alert signal units,
    wherein the converters comprise of analog to digital converter, digital to analog converter and the like,
    wherein the signal intervention/modification box/unit is installed between the torque sensor and the electronic control unit of the steering motor to turn the wheels, the microprocessor is configured to load the instructions into the memory and to receive user authentication data from the user device and is programmed to fetch and compare the user authentication data and authentication data/code/image from the server or from the internal storage of microprocessor, the programmed microprocessor enables a cloud based/in-device authentication from the server and is configured to detect events indicating an unauthorized entry into the vehicle and notifying a control function to the alert signal unit,
    wherein the signal intervention unit is configured to execute instructions at the microprocessor with computer instructions enabled functional flow intervention module, to provide the response to the event, based on authentication status by the authentication module, and
    wherein the response comprises of allowing/altering the signal from the torque sensor to the electronic control unit of the vehicle.

It is another aspect of the present invention to provide a signal-based vehicle anti-theft authentication system, wherein the analog to digital converter (ADC) is configured to read the analog signals from the sensor and to convert the analog signal values into digital values to the microprocessor.

It is another aspect of the present invention to provide a signal-based vehicle anti-theft authentication system, wherein the microprocessor sends the converted digital signal received from the sensor to the electronic control unit and allows normal movement of the vehicle, if the authentication status is valid/authentic.

It is another aspect of the present invention to provide a signal-based vehicle anti-theft authentication system, wherein the alteration of signal comprises of sending of digitally altered pre-configured signal to the electronic control unit for driving the steering motor in only one direction either clockwise or anti-clockwise direction that is pre-defined in the microprocessor, if the authentication status is invalid/failed.

It is another aspect of the present invention to provide a signal-based vehicle anti-theft authentication system, wherein the signal from the sensor comprises of voltage signal, current signal, sensor signal, optical signal, wireless signal, magnetic signal and the like.

It is another aspect of the present invention to provide a signal-based vehicle anti-theft authentication system, wherein the events comprise of successful authentication, failed authentication, hacking of programs, locking of programs, recording of credentials of user, timestamp, location of vehicle, shutting down the microprocessor, unlocking a locked program, restarting the microprocessor which is shutdown and the like.

It is another aspect of the present invention to provide a signal-based vehicle anti-theft authentication system, wherein the events are stored in the memory real-time and offline/asynchronous.

It is another aspect of the present invention to provide a signal-based vehicle anti-theft authentication system, wherein the electronic control unit is configured to receive the analog signals and send signal to the steering motor to steer the wheels.

It is another aspect of the present invention to provide a signal-based vehicle anti-theft authentication system, wherein the signal-based vehicle anti-theft authentication system is configured for extraneous conditions to allow the driver/user to enter special authentication code and to send SOS alert to the owner/main user device/law enforcement device with location of the vehicle using the GPS.

It is another aspect of the present invention to provide a signal-based vehicle anti-theft authentication system, wherein the extraneous conditions comprise of vehicle hijack, accidents, breakdowns and the like.

It is another aspect of the present invention to provide a signal-based vehicle anti-theft authentication system, wherein the complete lockdown of the vehicle is performed with secure authentication (when the number of attempts of authentication exceeds the configured number of retry), which is unlocked and driven by users/drivers duly authenticated.

It is another aspect of the present invention to provide a signal-based vehicle anti-theft authentication system, wherein the signal intervention/modification box/unit is configured to be installed by the original equipment manufacturer/dealer at point of sale into new generation devices/vehicles and the signal intervention/modification box/unit is retrofitted in the circuit of the existing devices/vehicles.

It is another aspect of the present invention to provide a signal-based vehicle anti-theft authentication system, wherein the embedded microprocessor sends an audio/visual alert by the alert signal unit to the owner device of the vehicle/law enforcement user device on the security network configured in the device upon receiving failed authentication code by the user/driver.

It is another aspect of the present invention to provide a signal-based vehicle anti-theft authentication system, wherein the user is authenticated by checking the personal identification details comprises of name, mobile number, credentials like driving license and the like for operating the signal-based device.

It is another aspect of the present invention to provide a signal-based vehicle anti-theft authentication system, wherein the authentication modules comprise of smart device, bio-metric unit, Bluetooth unit, near field communication unit, face recognition sensor, finger print sensor, identification unit, and the like.

It is another aspect of the present invention to provide a signal-based vehicle anti-theft authentication system, wherein the authentication data comprises of password, bio-metric, voice command, video command, one-time password, driving license, National Unique ID (e.g., Aadhar in India), face recognition, finger print and the like.

It is another aspect of the present invention to provide a method of working of the signal-based authentication system for electromechanical devices, comprising of the steps:
  installation of the signal intervention/modification box/unit between the workflow sensor/functional component and the integrated circuit controller of a device;
  switching on of the start-up unit;
  requesting an authentication code/image input interface to be entered in the user device configured in the device;
  entering an authentication code/image by the user on the user device within a predefined time-out period;
  transferring of the above user authentication input code/image to the microprocessor;
  fetching and comparing the user authentication data and authentication data/code/image from the server by the programmed microprocessor enabling a cloud based/in-device authentication from the server;
  detecting of events indicating an unauthorized entry into the device and notifying a control function to the alert signal unit;
  executing programs by the embedded microprocessor programming logic; and
  if necessary, providing the response to the event, based on authentication status by the authentication module,
    wherein the response comprises of altering/allowing the signal from the workflow sensor/functional component to the integrated circuit controller of a device, wherein the analog to digital converter is configured to read analogue signal values from the sensor/component and to convert the signal values into digital values to the microprocessor,
    wherein the microprocessor sends the digital signal received from the sensor/component to the integrated circuit controller and allows normal function of the device, if the authentication status is valid/authentic, and
    wherein the alteration of signal comprises of sending of digitally altered pre-configured signal to the integrated circuit controller for functioning of the device in abnormal manner that is pre-defined in the microprocessor, if the authentication status is invalid/failed.

It is another aspect of the present invention to provide a method of working of the signal-based authentication system for electromechanical devices, wherein the electromechanical devices comprise of steering lock device, electric starter mechanism, fuel supply system, automatic teller machine, secret locker device, authenticated medical devices for measuring/recording critical illness, vehicle anti-theft authentication system and the like.

It is another aspect of the present invention to provide a method for working of the signal-based smart vehicle anti-theft authentication system, comprising of the steps:
  installation of the signal intervention/modification box/unit between the torque sensor and the electronic control unit of the vehicle;
  turning on the ignition switch;
  requesting an authentication code/image input interface to be entered in the user device configured in the vehicle;
  entering an authentication code/image by the user on the user device within a predefined time-out period;
  transferring of the above user authentication input code/image to the microprocessor;
  fetching and comparing the user authentication data and authentication data/code/image from the server, by the programmed microprocessor enabling a cloud based/in-device authentication from the server;
  detecting of events indicating an unauthorized entry into the vehicle and notifying a control function to the alert signal unit;
  executing programs by the embedded microprocessor programming logic; and
  providing response to the event, based on authentication status by the authentication module,
    wherein the response comprises of altering/allowing the signal from the torque sensor to the electronic control unit,
    wherein the analog to digital converter (ADC) is configured to read analogue signal values from the sensor and to convert the signal values into digital values to the microprocessor.
    wherein the microprocessor sends the digital signal received from the sensor to the electronic control unit and allows normal movement of the vehicle, if the authentication status is valid/authentic, and
    wherein the alteration of signal comprises of sending of digitally altered pre-configured signal to the electronic control unit for driving the steering motor in only one direction either clockwise or anti-clockwise direction that is pre-defined in the microprocessor, if the authentication status is invalid/failed.

It is another aspect of the present invention to provide a method for working of the signal-based smart vehicle anti-theft authentication system, wherein the user has to authenticate within pre-configured number of times, failing which, the authentication module is disabled from further access.

It is another aspect of the present invention to provide a method for working of the signal-based smart vehicle anti-theft authentication system, wherein the audio/visual alert is generated by the alert signal unit to alert the owner/main user device regarding one-way turning of the steering/vehicle.

It is another aspect of the present invention to provide a method for working of the signal-based smart vehicle anti-theft authentication system, wherein for re-authentication, the user unlocks the authentication module in the memory of the microprocessor using a special code/image known only to the owner/authorized user.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DESCRIPTION FOR DRAWINGS WITH REFERENCE NUMERALS

Figure 1:
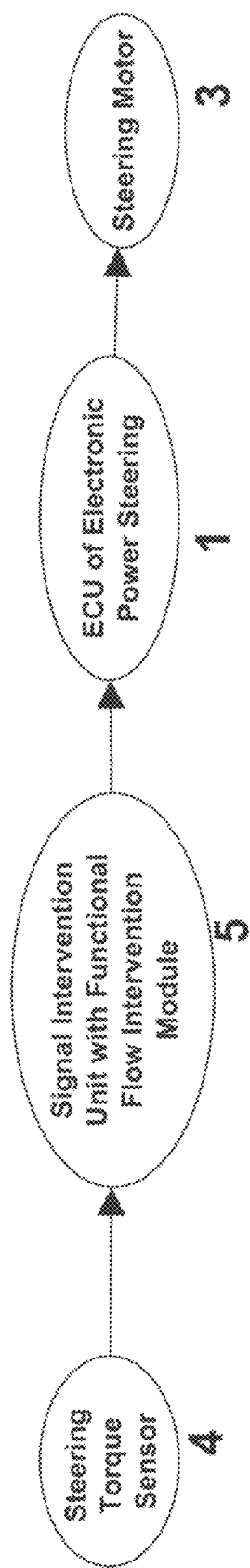
FIG. 1 illustrates an overview of the signal-based smart vehicle anti-theft authentication system in accordance with the present invention.

[1] Electronic control unit
[2] Steering wheel
[3] Steering motor
[4] Sensors
[5] Signal intervention/modification box/unit
[6] Torque sensor output signal
[7] Gear box
[8] Rack
[9] User devices
[10] Starter/Ignition switch
[11] Server
[12] Microprocessor

DETAILED DESCRIPTION OF THE INVENTION

The present invention relates to the field of authentication systems. More particularly, it relates to the electronic signal-based authentication system. It relates to an authentication system which integrates into devices in electro-mechanical systems without interfering with any of its internal functions and hence provides an ease of maintenance and upgradability. More particularly, the present invention relates to prevention of un-authorized usage of electro-mechanical systems.

The signal based authentication system for electromechanical devices, comprising of one or more power on/starter units, an integrated circuit controller, one or more converters, one or more user devices, one or more workflow sensors/functional components, a server, a memory, a power supply unit, a signal intervention/modification box/unit comprising one or more microprocessors with embedded computer instructions, input-output ports, one or more networking units, one or more communication units, one or more display units and one or more actuators, one or more authentication modules and one or more alert signal units.

The converters comprise of analog to digital converter, digital to analog converter and the like. The signal intervention/modification box/unit is installed between the workflow sensor/functional component and the integrated circuit controller of the device. The microprocessor is configured to load the instructions into the memory and to receive user authentication data from the user device and is programmed to fetch and compare the user authentication data against authentication data/code/image from the server/from the internal memory of microprocessor. The programmed microprocessor enables a cloud based/in-device authentication from the server and is configured to detect events indicating an unauthorized entry into/operation of the device and notifying a control function to the alert signal unit. The signal intervention unit is configured to execute instructions at the microprocessor, to allow/alter the response to the event, based on authentication status by the authentication module. The response comprises of allowing/altering the signal from the workflow sensor/functional component to the integrated circuit controller of the device.

The analog to digital converter (ADC) is configured to read the analog signal values from the sensor/component and to convert the signal values into digital values and send the same to the microprocessor. The microprocessor is configured to send the converted digital signal received from the sensor/component to the integrated circuit controller and allows normal function of the device, if the authentication status is valid/authentic. The alteration of signal comprises of sending of digitally altered pre-configured signal to the integrated circuit controller for functioning the device in an abnormal manner that is pre-defined, if the authentication status is invalid/failed. The signal from the workflow sensor/component comprises of voltage signal, current signal, sensor signal, optical signal, wireless signal, magnetic signal and the like. The events comprise of successful authentication, failed authentication, hacking of programs, locking of programs, recording the credentials of user, timestamp, location of equipment, system shutdown forcing only authorized user to unlock/restart the system and the like. The events are stored in the memory real-time and offline/asynchronous. The electromechanical devices comprise of steering lock device, electric starter mechanism, fuel supply system, automatic teller machine, secret locker device, authenticated medical devices for measuring/recording critical illness, vehicle anti-theft authentication system and the like.

The method of working of the signal-based authentication system for electromechanical devices, comprising of the following steps. The signal intervention/modification box/unit is installed between the workflow sensor/functional component and the integrated circuit controller of a device. The start-up unit is switched on. An authentication code/image input is requested to be entered in the user device configured in the device. An authentication code/image is entered by the user on the user device within a predefined time-out period. The above user authentication input code/ image is transferred to the microprocessor. The user authentication data and authentication data/code/image are fetched and compared from the server by the programmed microprocessor enabling a cloud based/in-device authentication from the server. The events indicating an unauthorized entry into the device is detected and a control function is notified to the alert signal unit. The programs are executed by the embedded microprocessor programming logic. The response is provided to the event, based on authentication status by the authentication module.

The response comprises of allowing/altering the signal from the workflow sensor/functional component to the integrated circuit controller of a device. The analog to digital converter is configured to read analogue signal values from the sensor/component and to convert the signal values into digital values to the microprocessor. The microprocessor sends the digital signal received from the sensor/component to the integrated circuit controller and allows normal function of the device, if the authentication status is valid/authentic. The alteration of signal comprises of sending of digitally altered pre-configured signal to the integrated circuit controller for functioning the device in abnormal manner that is pre-defined in the microprocessor, if the authentication status is invalid/failed.

General Processing Steps:

a) Choose device functions (can be multiple or complete device) to be secured.

b) Install (or use existing) standard microprocessor (control unit) in the electrical line between the operator starting/signal device/master device and the functional device's functions to be secured.

c) Install/Integrate embedded security software in to the microprocessor.

d) Store reference authentication data in data store attached to microprocessor/cloud.

e) Upon start of equipment, accept authentication from operator/signal device/master device.

f) Authenticate the user against data from the microprocessor data store/cloud.

g) Upon successful authentication, allow normal operation of device.

h) Upon failure of authentication, prevent usage of device or device's target functions.

EXEMPLARY EMBODIMENT

The present invention relates to the field of authentication systems. The present invention relates to a vehicle anti-theft authentication system which integrates into a vehicle's electro-mechanical systems without interfering with any of its internal functions and hence provides an ease of maintenance and upgradability.

Figure 2:
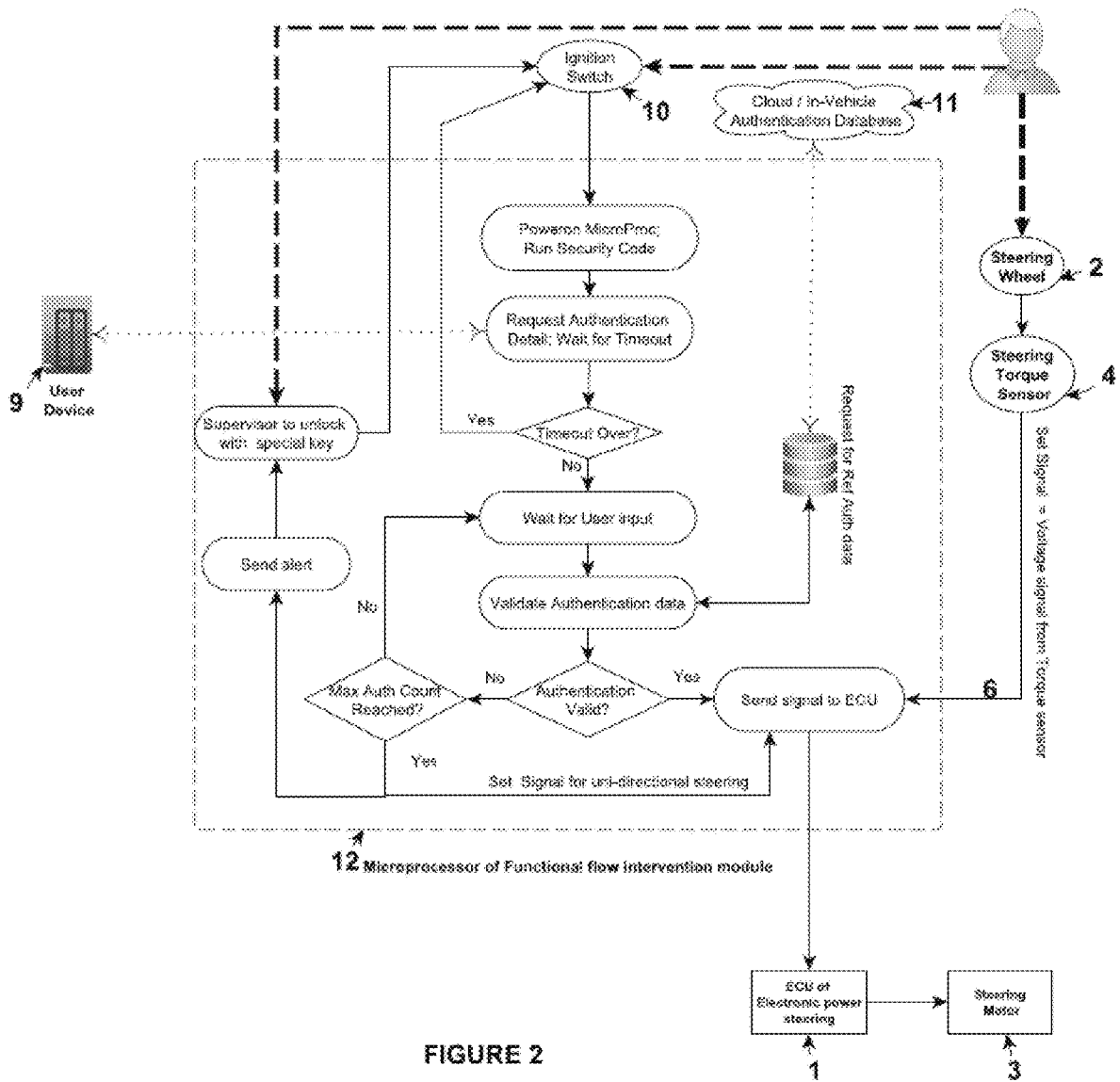
FIG. 2 illustrates the flow diagram of the detailed implementation of signal-based smart vehicle anti-theft authentication system in accordance with the present invention.
Figure 3:
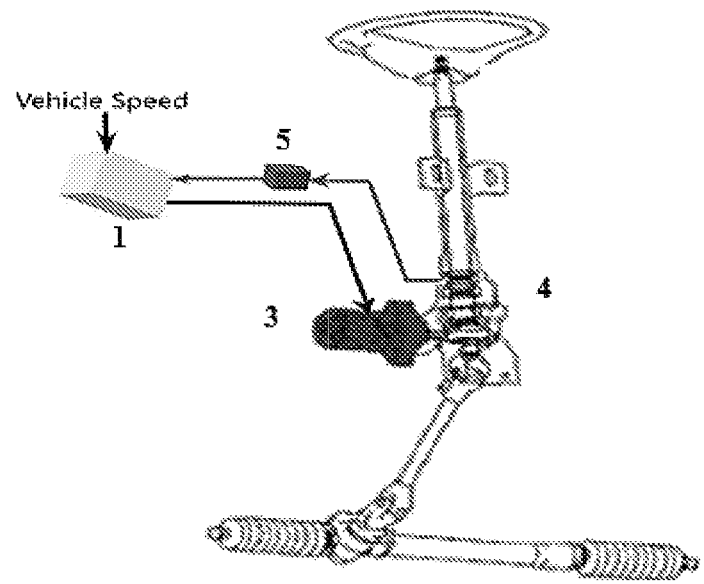
FIG. 3 illustrates the schematic block diagram of the signal-based smart vehicle anti-theft authentication system illustrating the signal intervention by the microprocessor in Signal intervention/modification box/unit.
Figure 3:
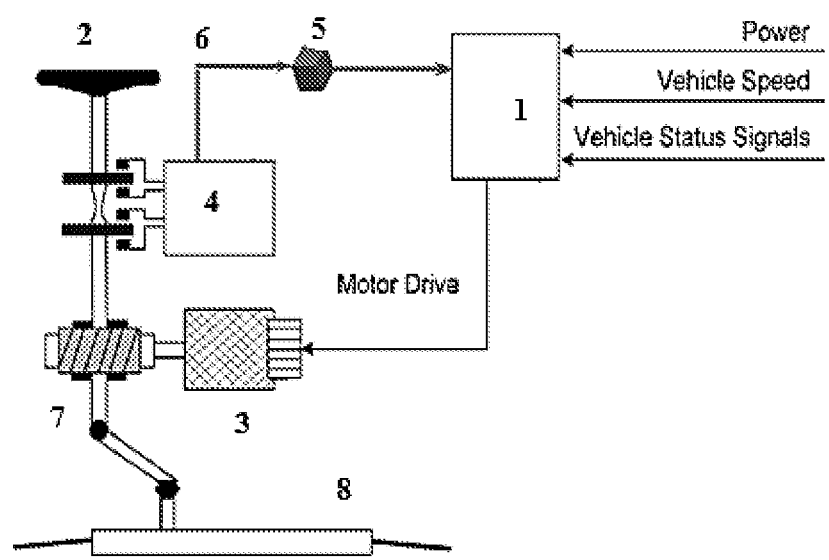

Referring to FIG. 1 an overview of the signal-based smart vehicle anti-theft authentication system in accordance with the present invention is illustrated. Referring to FIG. 3 the schematic block diagram of the signal-based smart vehicle anti-theft authentication system illustrating the signal intervention by the microprocessor is explained. Referring to FIGS. 2 & 3, the signal-based vehicle anti-theft authentication system, comprising of one or more ignition switches [10], one or more converters, one or more user devices [9], one or more torque sensors [4], a server, a memory, a power supply unit, a steering wheel [2], a gear box [7], a rack [8], a steering column shaft, a steering motor [3], a global positioning system (GPS), a signal intervention/modification box/unit [5] comprising one or more microprocessors with embedded computer instructions, input-output ports, one or more networking units, one or more communication units, one or more display units one or more authentication modules and one or more alert signal units.

The converters comprise of analog to digital converter, digital to analog converter and the like. The signal intervention/modification box/unit [5] is installed between the torque sensor [4] and the electronic control unit [1] of the steering motor [3] to steer the wheels. The microprocessor [12] is located inside the signal intervention/modification box/unit [5]. The microprocessor [12] is configured to load the instructions into the memory and to receive user authentication data from the user device [9] and is programmed to fetch and compare the user authentication data against the authentication data/code/image from a server [11]/from the internal storage of microprocessor. The programmed microprocessor [12] enables a cloud based/in-device authentication from the server [11] and is configured to detect events indicating an unauthorized entry into the vehicle and notifying a control function to the alert signal unit. The signal intervention unit [5] is configured to execute instructions at the microprocessor [12] with computer instructions, to allow/alter the response to the event, based on authentication status by the authentication module. The response comprises of allowing/altering the signal [6] from the torque sensor [4] to the electronic control unit [1] of the vehicle.

The analog to digital converter (ADC) is configured to read the analog signals from the sensor [4] and to convert the signal values [6] into digital values to the microprocessor [12]. The microprocessor [12] sends the converted digital signal received from the sensor [4] to the electronic control unit [1] and allows normal movement of the vehicle, if the authentication status is valid/authentic. The alteration of signal comprises of sending of digitally altered pre-configured signal to the electronic control unit [1] for driving the steering motor [3] in only one direction either clockwise or anti-clockwise direction that is pre-defined in the microprocessor [12], if the authentication status is invalid/failed. The signal from the sensor [4] comprises of voltage signal, current signal, sensor signal, optical signal, wireless signal, magnetic signal and the like. The events comprise of successful authentication, failed authentication, hacking of programs, locking of programs, recording of credentials of user, timestamp, location of vehicle, shutting down the microprocessor, unlocking a locked program, restarting the microprocessor which is shut down and the like. The events are stored in the memory real-time and offline/asynchronous.

The steering motor [3] is configured to receive signal from the electronic control unit [1] and to drive the steering motor [3] to steer the wheel in clockwise, anti-clockwise or straight direction. The signal-based vehicle anti-theft authentication system is configured for extraneous conditions to allow the driver/user to enter special authentication code and to send SOS alert to the owner/main user device/law enforcement device with location of the vehicle using the GPS. The extraneous conditions comprise of vehicle hijack, accidents, breakdowns and the like. The complete lockdown of the vehicle is performed with secure authentication, which can be unlocked and driven by users/drivers duly authenticated. The signal intervention/modification box/unit [5] is configured to be installed by the original equipment manufacturer/dealer at point of sale into new vehicles and the signal intervention/modification box/unit [5] is retrofitted in the circuit of the existing vehicles. The embedded microprocessor [12] sends an audio/visual alert to the main user device/law enforcement user device on the security network configured in the device upon receiving failed authentication code by the user/driver. The user is authenticated by checking the personal identification details which comprise of name, mobile number, user credentials such as driving license and the like for operating the signal-based device. The authentication modules comprise of smart device, bio-metric unit, Bluetooth unit, near field communication unit, face recognition sensor, finger print sensor, and the like. The successful/failed attempts in the usage are recorded in in-vehicle/cloud database. The authentic data collected can be used for variety of purposes as listed in Benefits section below. The authentication data comprises of password, bio-metric, voice command, video command, one-time password, driving license, National Unique ID (e.g., Aadhar in India), face recognition, finger print and the like.

Anti-theft authentication system uses an automobile's steering system torque sensor, it's electronic control unit, steering motor and a highly secure authentication mechanism to prevent it from being burgled and driven away.

The operation of the EPAS (Electronic Power Assisted Steering) is achieved by firstly sensing the amount of effort, or torque, applied to the steering wheel by means of a torque sensor. This torque sensor is easily incorporated within the steering column. An electric circuit is able to relay this information into an electronic control unit (ECU). The control algorithm generates a signal that drives the electric motor to provide steering assistance.

If the input received from the user is authentic, then the voltage signal received from the torque sensor is transmitted without modification to the electronic control unit and the steering of vehicle behaves normally.

If the user is not authenticated, the embedded microprocessor programming logic passes a configured voltage to the electronic control unit which drives the motor in only one direction that is pre-defined in the microprocessor.

Figure 4:
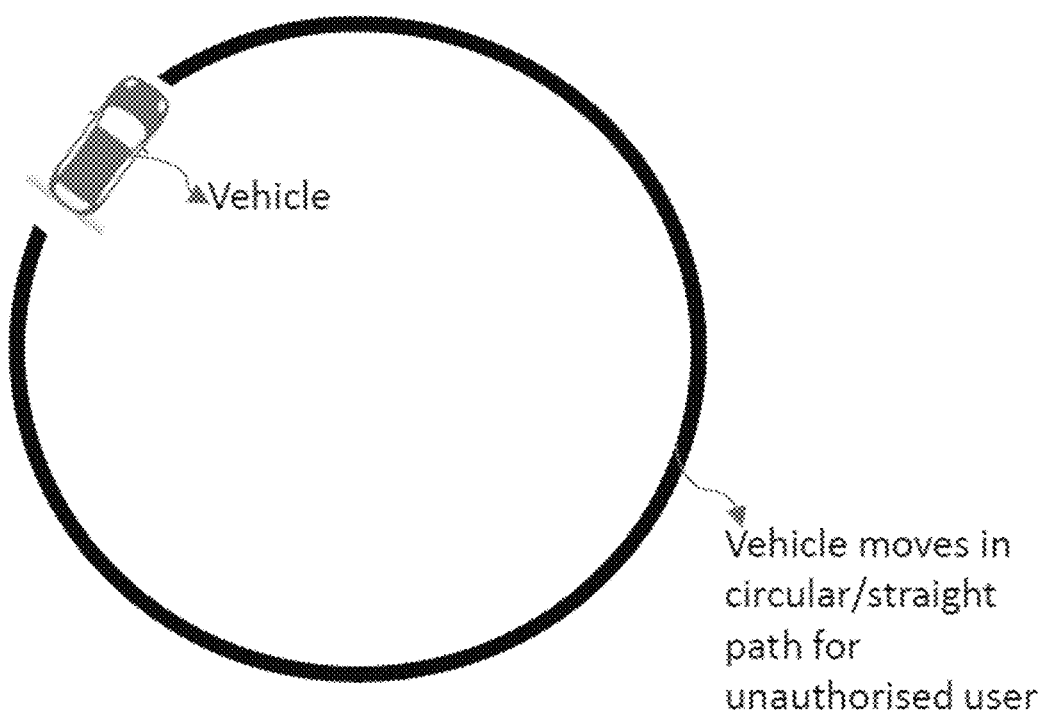
FIG. 4 illustrates the vehicle movement in a circular path for the unauthorized user.

Referring to FIG. 2, the flow diagram of the detailed implementation of signal-based smart vehicle anti-theft authentication system in accordance with the present invention is illustrated. Referring to FIG. 4 the vehicle movement in a circular path for the unauthorized user is illustrated. The method for working of the signal-based smart vehicle anti-theft authentication system, comprising of the following steps.

a) The signal intervention/modification box/unit [5] is installed between the torque sensor [4] and the electronic control unit [1] of the vehicle.

b) Install embedded security software in the processor.

c) Store authentication data in data store attached to microprocessor/cloud.

d) The ignition switch [10] is switched on.

e) An authentication code/image input interface is requested to be entered in the user device [9] configured in the vehicle.

f) An authentication code/image is entered by the user on the user device [9] within a predefined time-out period.

g) The above user authentication input code/image is transferred to the microprocessor [12].

h) The user authentication data and authentication data/code/image are fetched and compared from the server [11], by the programmed microprocessor [12] enabling a cloud based/in-device authentication from the server [11]. The events indicating an unauthorized operation of the vehicle are detected and a control function is notified to the alert signal unit. The programs are executed by the embedded microprocessor programming logic [12]. The response is provided to the event, based on authentication status by the authentication module. The response comprises of allowing/altering the signal [6] from the torque sensor [4] to the electronic control unit [1].

i) The analogue to digital converter (ADC) is configured to read signal values [6] from the sensor [4] and to convert the signal values [6] into digital values and send to the microprocessor [12].

j) The microprocessor [12] sends the digital signal received from the sensor [4] to the electronic control unit [1] and allows normal movement of the vehicle, if the authentication status is valid/authentic. The alteration of signal comprises of sending of digitally altered pre-configured signal to the electronic control unit [1] for driving the steering motor [3] in only one direction either clockwise or anti-clockwise direction that is pre-defined in the microprocessor [12], if the authentication status is invalid/failed.

The user has to authenticate within pre-configured number of times, failing which, the authentication module is disabled from further access. The audio/visual alert is generated by the alert signal unit to alert the owner/main user device regarding unidirectional steering of the vehicle (Refer FIG. 4) and prevent the vehicle being driven away and alert the owner through SMS and the like as configured in the software etc. For re-authentication, the user unlocks the authentication module in the memory of the microprocessor [12] using a special code/image known only to the owner/authorized user.

In vehicle hijack conditions, driver sends an extra SOS byte/use button to send SOS to law agencies and owner.

The authentication can be merged into existing vehicle entry control mechanisms such as key fob, or can be made an additional layer of security such as Smartphone etc.

The present invention is secure and seamlessly integrates with the above described EPAS function, microprocessor based black box that sits in between the steering column torque sensor and the electric/electronic control unit that drives the steering shaft motor to steer the wheels.

Key Features:

Patent is designed for electro-mechanical systems with functional flow intervention. The analogue/digital signals flow is to the device are controlled, (for example voltage) using secure embedded software logic. Coalesces into device's natural functioning & controls the same without interference. Virtually hack proof as the solution integrates seamlessly in to the device's existing hardware/software. Authentication flexibility—Existing security mechanisms can be used or new ones can be implemented—Future proof. The present invention is easily Retrofittable. The usage data collection is facilitated by owner/law enforcement for effective device security management. The innovative extensions are provided to device security—Providing action alerts to stall forced usage under duress. The present invention has very low additional incremental and maintenance effort and cost.

For the vehicle anti-theft, the signal intervention/modification box/unit is installed in between torque sensor and electronic control unit to control the direction of steering motor rotation. The authentication microprocessor is integrated in the vehicle to control function. The authentication system is integrated in the ignition system of new vehicle or retrofitted in older vehicles. Seamless vehicle security features are offered to Original equipment manufacturer. The vehicle wheel steering direction is controlled based on authentication. Authentication mechanism is built into/for natural function of vehicle. The recovery assistance from anti theft device is achieved without use of GPS. Access control devises assist to collect authentic usage data (Eg., odometer can be fudged). For example, access control device can assist in collecting and storing log information and the microprocessor can store such log of all events.

Sequence of Operation:

1. Driver starts the ignition.
2. Vehicle battery powers up all electric components including the security device which is a microprocessor. Security code is loaded and runs in microprocessor (or can be executed from a secure remote server/cloud depending on portability to ECU computing architecture)
3. The security program configures (Refer Vehicle Security and Configuration Setup) the signal to ECU to drive the Steering electric motor to rotate in one-direction (steering directional lock is set) which will make the vehicle wheels steer only in one direction.
4. Security program requests authentication details and waits for authentication inputs from (or communicates with) the mobile device which the driver would use to enter authentication data. This can be a password, bio metric, voice command, OTP etc. If the authentication data is not received within authentication time-out period (Refer Vehicle Security and Configuration Setup), the security code is unloaded. The operator has to start the ignition again to initiate authentication.
5. Upon receiving authentication data, security program will access the authentication data registered in vehicle database or access a secure external database (Eg., RTO database for verifying smart card-based driving license etc) for comparison (Refer Vehicle Security and Configuration Setup).
6. At this point, this program also reads the torque sensor signal. This signal is only read and not processed. If the operator credentials are not valid, request is sent to operator to provide correct credentials. Number of such retries is configurable (Refer Vehicle Security and Configuration Setup).
7. If authentication succeeds, the steering directional lock is not applied and the security program passes the torque sensor signal value without modification to steering ECU/drive motor for normal steering direction and vehicle can be driven away.
8. If authentication fails, the steering directional lock is set, which makes a single way steering direction signal to ECU/drive assist motor. Also, an audio-visual signal alerts the operator about steering directional lock and uni-directional steering. Since the ignition is already on, the operator may tend to ignore audio-visual warning and generally tries to drive the vehicle, to move forward or backward. During this process, operator will necessarily have to steer the vehicle either left or right to manoeuvre the vehicle by turning the steering wheel. Since the steering directional lock is already on, this ensures vehicle security. Despite the driver turning the steering wheel in either direction upon engaging the gear, irrespective of whether the steering wheel is turned right or left, vehicle wheel turns only in one configured direction (Refer Vehicle Security and Configuration Setup) and hence the vehicle cannot be driven away. After the detection of authentication failure, after a configured number of attempts, the engine will automatically shut down and microprocessor feeding the voltage signals to ECU is also shut down (Refer Vehicle Security and Configuration Setup).
9. If the steering directional lock is set after the specified failed attempts, the Supervisor/Owner of vehicle has to authorize with a special code, before restart of the vehicle.
10. The operator, can try to authenticate number of times (Refer Vehicle Security and Configuration Setup). An alert is sent to the owner of the vehicle for every successful/failed attempt. Beyond a certain number of failures (Refer Vehicle Security and Configuration Setup), an alert can be made to be sent to law enforcement agency.

Real Life Scenarios of Embodiment:

1) Stationery Vehicle:

When a stationery vehicle in off condition is started, an authentication mechanism forces the driver to enter an authentication code in his hand-held device such as mobile phone using Bluetooth stack or use bio-metric or use any other security mechanism configured in the vehicle. The system then fetches a bio-metric image or an authentication code (or any other relevant data) from secure cloud storage/in vehicle storage and compares the same with the information entered/image captured by the driver.

If the match (and hence authentication) is SUCCESSFUL, embedded microprocessor-based programming logic allows the voltage signals from the torque sensor of steering system to be passed on to the electronic control unit of the vehicle to drive the steering motor under normal conditions.

If the authentication FAILS, the programming logic built in to the microprocessor passes a pre-configured voltage to the electronic control unit which uses the input to drive the motor in only one direction after a configured number of attempts to authenticate. This forces the vehicle to turn in only one direction and hence the vehicle cannot be driven away. After each success/failure, alert is sent to owner's mobile. After repeated failures, alert is sent to law enforcing agencies.

2) Under Forced Hijack Conditions:

When stopped at gun/knife point, driver of the vehicle needs to first switch off ignition. When forced to restart, he can use an SOS authentication code that is either a different pass code or his bio-metric with a special button in his mobile to drive the vehicle. The microprocessor then interprets and differentiates the SOS pass code from the normal one and sends an alert to connected police network and even to another mobile (For E.g., vehicle owner's mobile or multiple mobile numbers such as call center etc.) configured in the system. The steering directional lock is not applied, and optionally turn on GPS recording and the vehicle can run normally. The alert will enable the law enforcement authority to locate the vehicle and intercept appropriately to save the driver and prevent the vehicle from being stolen and driven away.

3) Vehicles Violating Traffic Rules:

As the vehicle is fitted with the registration details which are electronically transmittable, the law enforcing authorities can implement suitable detection system at traffic signal, to detect vehicles violating signals and issue tickets resulting in better law enforcement. (Linking of this system to any vehicle tracking system E.g., FASTag can also be done).

This invention provides the flexibility to OEM to seamlessly add additional security features, devices and solutions to enhance vehicle security.

Vehicle Security and Configuration Setup:

This invention provides for configuring the vehicle security parameters either in the plant assembly by the OEM, at dealer point or by the owner authorized to modify the factory set-up. These data can either be stored in-vehicle in a secure storage or in cloud/remote server.

1. During Vehicle Registration—
    a) Record the owner's credentials (E.g., Driving license, Mobile number etc)
    b) The default direction of turning (Left or right) during directional lock of steering. This may depend on left-hand or right-hand driving.

c) Configure device(s) for authentication E.g., cell phone, biometric etc d) The law-enforcement authority to whom alert will be sent, in case of attempted theft.

2. Initial Setup by Owner of Vehicle.

a) List of authorized persons and their authentication details. Details of driver/s that have been removed from service or are no more authorized to drive the vehicle can be easily removed.

b) Set/Modify Supervisor password, to restart the vehicle after authentication failure.

c) Contact details (E.g., Cell-phone) for sending alert message during every success/failure of vehicle start.

d) Configure audio-visual alert during authentication failure.

e) Time-out period after ignition start before user authentication.

f) Number of attempts allowed before authentication failure is recognized.

g) Configure data storage (local/cloud storage for operator credentials, access to RTO database etc.)

h) Configure the extent of data collected (E.g., odometer reading, start/stop timing, incidents occurred)

Working Example:

The following is a specific implementation (Working example) of the Exemplary Embodiment described earlier A working model is made with a turning knob, (that simulates a steering), Dual Sensor that generate two voltage signals when knob is turned, a DC/stepper motor, motor drive integrated circuit, two wheels representing vehicle wheels. This model closely represents real life working.

In an exemplary embodiment of the present invention, following implementation of the solution is described below. For illustration of Signal based vehicle anti-theft authentication system is implemented in a working example with the following components:

| SL | Component | Newly Added/ Replacement | Specification/ Representation | Remarks |
|---|---|---|---|---|
| 1 | Turn Knob | Replacement | Represents and simulates steering wheel | Turning the Knob helps achieve wheel turning. |
| 2 | Dual sensor | Replacement | Represents steering torque sensor Creates two sensor outputs when knob is turned | Provides sensor signal outputs similar to main and aux steering torque sensor |
| 3 | Column Shaft | Replacement | Represents steering column shaft | This is attached to the Knob at one end and activates the dual sensors at the other end. |
| 4 | Microprocessor | Newly Added | 1. Raspberry Pi 3 Model B Raspbian OS BCM 2837 64-bit processor 1 GB RAM Broadcom Wireless LAN and Bluetooth Low Energy On board GPIO pins for reading (input) and writing (output) digital signals SPI-Serial Peripheral Interface | On power up, loads the vehicle security program into memory and executes the same Reads ADC (Analog to Digital) IC for voltage values, Checks authentication input from the user mobile against an authentication value pre-stored in the microprocessor If user is authenticated, sends the digital voltage value received from dual sensors to the Motor Controller IC If user is not authenticated, changes the voltage signal to force the motor to rotate the wheel in only the pre-configured direction (left or right) and sends the same to Motor Controller IC |
| 5 | Analog to Digital Converter (ADC) | Newly Added | MCP3008 ADC IC 8 channels for connecting 8 analogue input devices | Two of the 8 channels used to read analogue signal from dual sensor, convert to digital values and send as digital output to Microprocessor. |
| 6 | Motor Controller IC | Newly Added | ULN2003A motor drive controller IC having digital and analogue pins that can be read from and written to | Receives the analogue signal and sends signal to steering motor wheel mechanism to steer the wheels |
| 7 | Drive Motor | Replacement | Stepper motor that helps rotate the wheel. This is similar to steering motor | Depending on the extent of Knob rotation, the signal received from the Motor Controller IC drives the steering mechanism attached to drive motor to steer the vehicle wheel left or right or straight. In straight drive conditions motor does not rotate |
| 8 | Battery | Replacement | Power supply 5 V | Power supply to drive the ADC, microprocessor components and drive motor IC and mechanism |

| SL | Component | Newly Added/ Replacement | Specification/ Representation | Remarks |
|---|---|---|---|---|
| 9 | Mobile Phone1 | Newly Added | Standard Android mobile phone with WIFI, Bluetooth paired with the Microprocessor, an authentication input entry app | This mobile is used by the vehicle user who needs to authenticate himself with the microprocessor authentication system |
| 10 | Mobile Phone2 | Newly Added | Standard Android mobile phone with WIFI connection and an app to display the alert messages from the security software | This mobile is used for receiving alerts on possible theft attempts and such alerts are sent by the security software running in the microprocessor. These mobiles can be with the owner and law enforcing agencies or call centres |

Note
MCP3008 ADC IC, Raspberry PI, and ULN2003 motor driver IC together represents EPS ECU (Power Steering Electronic Control Unit) performs its functions, besides authenticating the user.

Process described below simulates the implementation of the core functionality described in FIG. 3. It uses the components detailed above to perform specific actions.

1. Power is switched on (this is the same as the user starting the ignition in a vehicle) Microprocessor, ADC, Motor Controller and Motor are powered on by the power supply. Security Software is loaded in to the microprocessor memory
2. ADC is used to read voltage signal, starts receiving the signal from Dual sensors when the turn knob attached is rotated
3. Dual sensor sends analogue voltage signals to ADC. However, no further action happens at this stage as this voltage signal remains in ADC and is not read by the Microprocessor or any other component
4. Security software reads critical pre-configured parameters from its local data storage. These parameters are reference authentication data, direction of wheel rotation when authentication fails, Maximum Number of attempts at authentication and Timeout period waiting for authentication input from the driver.
5. Security software initializes the Serial Peripheral Interface to send and receive data from ADC, Bluetooth socket connection to receive authentication input from Mobile Phone 1 from the user and waits for authentication input. It also creates client Wi-Fi socket connection to send alert messages to Mobile Phone 2.
6. GPIO pins needed for communication with ADC and motor drive controller IC s are also initialized for operation
7. User executes the authentication app in Mobile Phone 1 to enter the authentication pass code to be verified
8. If the user does not provide authentication input within the configured timeout value read in step 7, microprocessor sends an alert message to mobile phone 1 and shuts down the microprocessor. System needs to be powered on again and the user needs to re-authenticate.
9. If the user enters authentication input before timeout, security software receives the authentication input in Microprocessor's Bluetooth socket.
10. This input is checked against the reference authentication read in step 4 above
11. If the authentication match is successful,
    a) Security software reads analogue voltage signal in equivalent digital values from the ADC. SPI (Serial Peripheral Interface) driver in the OS is used to read this input in digital format
    b) Security software retains the voltage digital value read from ADC without change. These values are checked as follows and appropriate GPIO pins are enabled/disabled:
        i. for left turn—0 to <2.5 v in sensor input 1 and >2.5 v to 5 v in sensor input 2
        ii. for straight drive—both sensor inputs are 2.5 v
        iii. for right turn—>2.5 v to 5 v in sensor input 1 and 0 to <2.5 v in sensor input 2. Above pin values (signals) are passed on to motor controller IC.
    c) Motor-controller IC based on the values received, drives the stepper motor and thus turns the wheels as intended by the user
12. If the authentication fails
    a) Security software checks if maximum number of retries for authentication is reached. If the maximum number of retries is not reached, security software allows the user to enter authentication input again from mobile phone 1.
    b) If maximum retries is reached, security software sends an alert message on possible (vehicle) theft attempt to mobile phone 1.
    c) Software then sets an exception escalation flag to stop execution of software further and Microprocessor is shutdown
    d) Security software needs to be unlocked to be executed as intended again by a person authorized to do so through a special code only from a pre-configured mobile device. This ensures the software is secured from being hacked or stolen in locked condition
    e) Security software sets an appropriate set of GPIO pins as enabled or disabled to send signals to motor controller IC to rotate the motor in only the pre-configured direction (left or right) despite the user turning the knob (steering wheel) both ways
    f) Above pin values (signals) are passed on to the motor controller IC
    g) Motor controller IC drives the stepper motor to rotate only in the pre-configured direction (left or right) thus forcing the wheels to turn only in that direction despite the user attempting to turn the knob (wheel) in both direction h) Above locking ensures that the system (vehicle) is secured and cannot be stolen 13. All events, including successful authentication, failed attempts and locking of software, are logged for future audit of security incidents
14. Under extraneous conditions such as a vehicle hijack using arms, driver can enter a special pass code for authenticating successfully that will send an alert to mobile phone 2, and there by law enforcement agencies, as SOS alert message with vehicle location using GPS Benefits:

The signal-based device can be used for a variety of purposes, (as the vehicles are being driven by only authorized persons and their identity of the driver is known) such as:

1. Help collect data to control maintenance cost/incidents during the driving of a driver (for fleet owners).
2. Can trace the driver/owner of vehicle involved in an incident, especially hit and run or in crimes, carrying contraband goods etc.
3. Facilitate the creation and maintenance of KYD (Know Your Driver) database—Driver's driving habits and incident record which can be used by RTO (Road Transport Office) to take decisions regarding renewal of license and rate a driver (similar to credit score for a financial system). Just as a credit score database helps lenders identify potential borrowers with good credit score, KYD database will help vehicle owners identify drivers with safe driving score. This KYD database can be designed to prevent persons with criminal background own/drive vehicles.
4. Can help trigger alert regarding movement of criminals when they use vehicles.
5. Can be extended to communicate about an accident to the nearest control room and the driver concerned, which info can be used by Insurance companies to validate claims. Besides Insurance companies can come up with new schemes for vehicles/drivers predominantly driven by single user with few/no incidents.
6. Can facilitate the law enforcing authorities to track vehicles violating signals and one-way violation etc.
7. Allows integration with vehicle remote start mechanism that is needed for cold countries. In cold climatic conditions it is not possible to enter the vehicle under very cold conditions without heating the interior and warming up the engine before entering the vehicle. Owner/driver can use a remote start provided by the manufacturer for these aspects and this invention works seamlessly with the remote start feature. Physical presence of the driver inside the vehicle to authenticate and secure the vehicle is not mandatory as the security program will await authentication inputs from the driver after starting the vehicle and will not release the wheel rotation lock till authentication is successful. The same is applicable for very hot regions. As the duration for which the engine can be run without authentication is pre-configured, the engine is also protected.
8. Intermittent re-authentication by the authenticated driver can be automatically executed by the security program at configured time intervals. Vehicle will be permitted to run for a specific time to enable the driver to pull over and park the vehicle to avoid accidents at signal intersections. This feature can also be linked to vehicle hijack condition forcing the hijacker to authenticate again. And integrated with other mechanisms such as reducing vehicle speed or reducing gradually fuel flow to engine to force the driver to stop within a preconfigured time for providing alert, can also be considered.
9. Authentication can be open-ended (no time limit) or for a fixed period of time/distance (to cover service personnel, valet parking etc.)
10. In addition to engine start, authentication inputs can also be taken when the driver occupies driver seat (using seat sensor signal), a camera to capture driver image when vehicle is started etc.
11. Invention provides for flexible vehicle security that can be configured by OEM or at sales/service point. On ignition start, following additional options can be provided by the security program:

Ignition key/remote can contain the finger print reader. When the finger print reader sends authentication signal that is verified successfully, the steering lock is not applied.

Only authorized Bluetooth device (BT device address is unique) can initiate the authentication data verification. Inputs from any other BT device can be rejected or not taken Specific Bluetooth device ID s or addresses can be configured for verification in the security software. These BT addresses can be searched to accept authentication only from configured driver mobile devices. Such BT devices can alone be paired and allowed to exchange messages with the security software. Standard Bluetooth message encryption and security layer would prevent authentication message hacking.
12. Anti-theft security is increased by the fact that there is no data communication line between the security control unit and the steering lock (ECU/drive motor) which is accessible by a malicious code from outside by a hacker and which can be manipulated by unauthorized persons. Besides, the time available for any hacker to intrude is limited by the timeout feature. Flow intervention in the security program ensures that even if a thief manages to gain entry and start the vehicle, steering uni-directional lock is applied, prohibiting normal driving if authentication fails.
13. Driver/equipment operator identification can include—PIN code, driving license, finger print reader, facial recognition, questions only the correct driver can answer and the like. Driver license is suggested as valid check for automobiles, as this ensures validated knowledge of driving skill and prevents under-age driving. Even if the owner authorizes an under-age person to drive, he becomes liable.
14. Event log for tracing can be implemented. This can include authentication success or failure, number of attempts with time stamp, vehicle hijack SOS event, from and to locations based on GPS etc. GPS can be optionally enabled only when an incident such as an accident or hijack conditions happen. Event log analysis can be used to provide additional alerts, security or even restrict vehicle usage. This log can also help insurance authorities, besides help devise schemes for responsible driving.
15. If the security program reads a voltage value from torque sensor that falls beyond a pre-defined upper and lower circuit values, the vehicle can still be left locked, despite authentication succeeding, and a risk alert to the driver and other stake holders such as service center configured.

16. Embedded microprocessor security software for authentication and functional flow intervention to lock/unlock steering direction control helps in making the security very high. Security software can either be hosted in a separate secure microprocessor or can be embedded in the steering EPS ECU controller and this ECU can be secured. For a connected vehicle, this software can be executed from a secure remote/cloud environment (likely to be the future scenario).

Although, the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. An electronic signal based anti-theft authentication method for a vehicle by controlling a steering system, comprising of the steps:

configuring a signal intervention unit between a torque sensor of the steering system and power steering electronic control unit of the vehicle;

detecting and comparing authentication data according to a user input with pre-configured user authentication data upon ignition of the vehicle;

detecting of events indicating an unauthorized operation of the vehicle; and outputting a control signal in accordance to a detected authentication status by an authentication module and sending a signal from the torque sensor of the steering system to the power steering electronic control unit through the signal intervention unit, wherein the signal intervention unit comprises a functional flow intervention module configured to receive a signal from the torque sensor and send an altered pre-configured signal or an unaltered signal to the power steering electronic control unit for driving the steering motor, in accordance with a detection result provided in response based on the detected authentication status by the authentication module;

wherein, when the control signal indicates an unauthorized user, the functional flow intervention module sends the altered pre-configured signal to the power steering electronic control unit of the vehicle for setting a steering directional lock, resulting in the vehicle being steered only in one direction irrespective of the steering wheel being turned clockwise or anti-clockwise by the unauthorized user;

wherein, when the control signal indicates an authorized user, the functional flow intervention module sends the unaltered signal to the power steering electronic control unit of the vehicle, which does not set the steering directional lock, thereby allowing the vehicle to be steerable in all directions by the authorized user.

2. The electronic signal based anti-theft authentication method for the vehicle by controlling the steering system as claimed in claim 1, wherein the control signal to an alert signal unit is output, in accordance with the detected authentication status within a predefined time-out period or a number of un-successful attempts.

3. The electronic signal based anti-theft authentication method for the vehicle by controlling the steering system as claimed in claim 2, wherein after the predefined time-out period or attempts, authentication data is required to unlock the vehicle.

4. The electronic signal based anti-theft authentication method for the vehicle by controlling the steering system as claimed in claim 2, wherein the alert signal unit generates an audio and visual alert to a user device, in accordance with the detected authentication status.

5. The electronic signal based anti-theft authentication method for the vehicle by controlling the steering system as claimed in claim 1, wherein the events comprise of successful authentication, failed authentication, recording of credential of user, timestamp, and location of the vehicle, wherein failed authentication details are transmitted to an owner or law enforcement in real-time to know about unauthorized use.

* * * * *